United States Patent Office 2,966,369
Patented Dec. 27, 1960

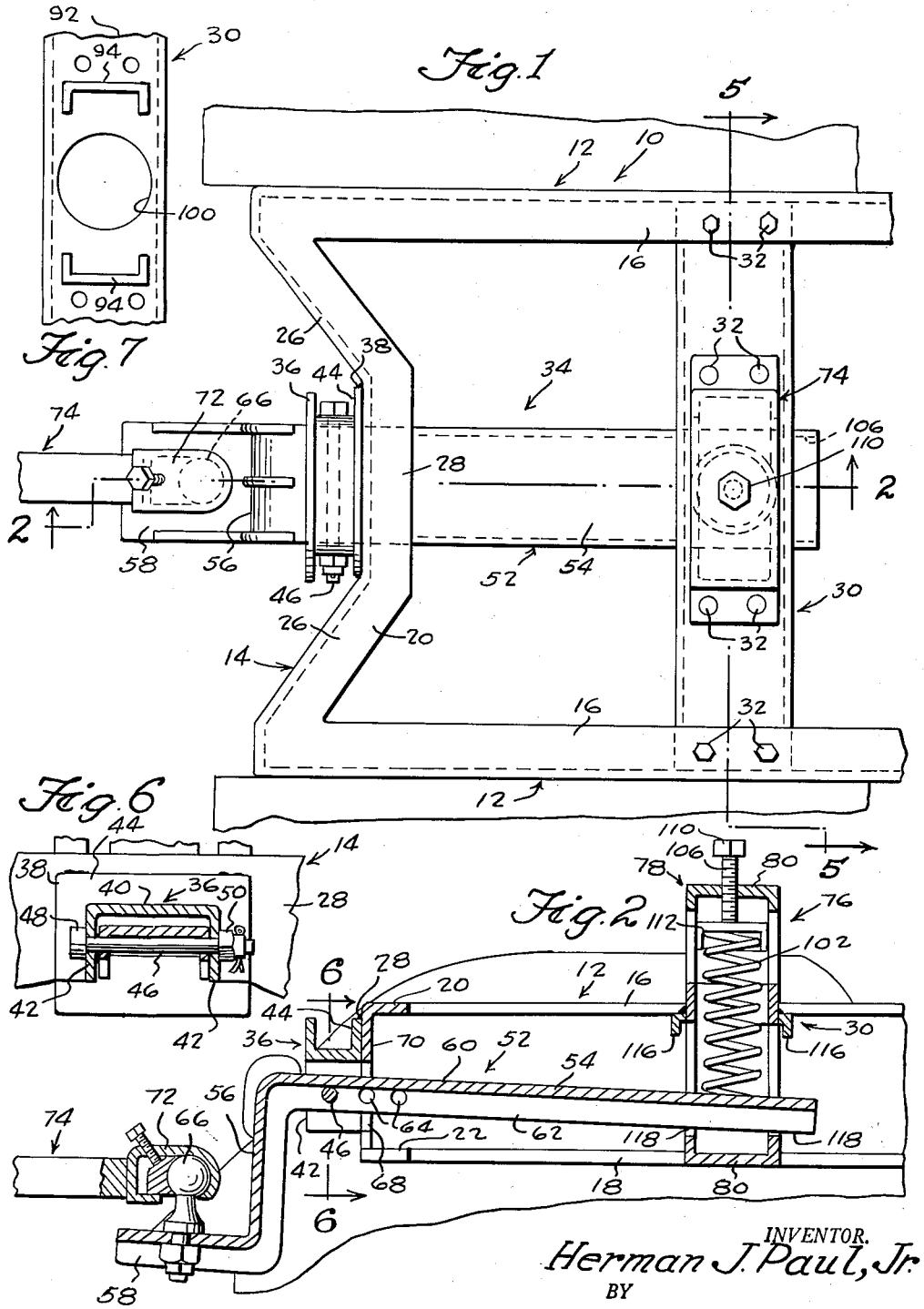

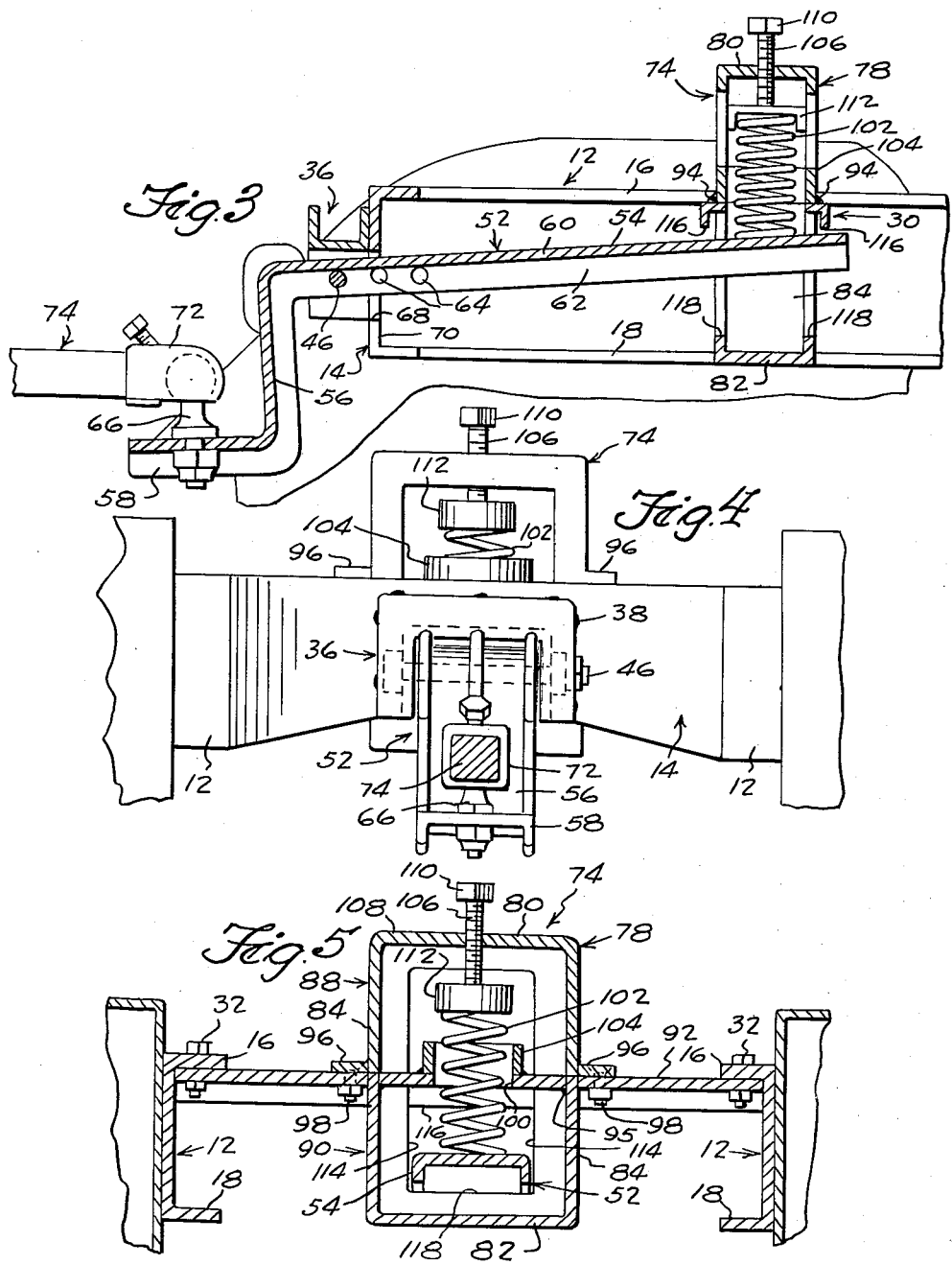

2,966,369

TRAILER HITCH

Herman J. Paul, Jr., Lake Worth, Fla.
(215 Katrina Circle, West Palm Beach, Fla.)

Filed Nov. 17, 1959, Ser. No. 853,587

6 Claims. (Cl. 280—489)

This invention relates to a novel trailer hitch, especially but not exclusively, for incorporation in truck chassis frames.

The primary object of the invention is to provide a generally superior spring-loaded hitch of the kind indicated which is stronger and more stable and is better suited than existing hitches for pulling and controlling heavy trailers, especially over rough roads and terrain, and which reduces and controls front end bouncing of trucks hitched to trailers.

Another object of the invention is to provide a more efficient and reliable hitch of the character indicated above, which is preferably in the form of a permanent installation on a truck chassis frame, but whose components are easily disassembled for repair and replacement, and for original installation; and wherein the loading spring means is readily adjustable to provide the cushioning or shock absorbency necessary to stabilize the trailer tongue under load and road stress and to reduce front end bouncing of the tractor truck.

A further object of the invention is to provide a hitch of the character indicated above which is uncomplex in construction, is composed of a small number of simple and easily assembled parts, and which can be made in rugged and well finished forms, and installed at relatively low cost.

Other important objects and advantageous features of the invention will be apparent from the following description and the accompanying drawings, wherein, for purposes of illustration only, a specific form of the invention is set forth in detail.

In the drawings:

Figure 1 is a fragmentary top plan view showing a hitch of the invention installed on a truck chassis frame, with a trailer drawbar connected thereto;

Figure 2 is a fragmentary vertical longitudinal section taken on the line 2—2 of Figure 1, showing the hitch tongue in a depressed position;

Figure 3 is a view similar to Figure 2, showing the hitch tongue in elevated position;

Figure 4 is a rear end elevation of the hitch, with the trailer drawbar in section;

Figure 5 is a vertical transverse section taken on the line 5—5 of Figure 1;

Figure 6 is a fragmentary vertical transverse section taken on the line 6—6 of Figure 2; and, Figure 7 is a fragmentary top plan view of a chassis frame cross member which supports the spring loading means.

Referring in detail to the drawings, wherein like numerals designate like parts throughout the several views, the numeral 10 generally designates a horizontal truck chassis frame having spaced longitudinal side members 12 which are spaced and connected at their rear ends by a rear cross member 14, the members 12 and 14 being of channel cross section and having inwardly extending upper and lower side flanges 16 and 18, and 20 and 22, respectively. Where it is desired to shorten the rearward extension of the present hitch beyond the rear end 24 of the chassis frame 10, the rear cross member 14 can be one which is centrally and forwardly indented, resulting in rearwardly divergent side portions 26 and a central straight portion 28 which is normal to the chassis side members 12. The foregoing structure constitutes no part of any invention except in combination therewith. Spaced forwardly from the rear cross member 14 is a relatively shallow, downwardly facing extra cross member 30, which is suitably fixed to the undersides of the upper flange 16 of the side members 12, as by means of bolts 32 extending therethrough, and which constitutes a component of my novel hitch, generally designated 34.

The hitch 34 comprises an inverted U-shaped pivot pin housing 36, which is fixed, as by welding 38, to the rear side of the central portion 28 of the rear chassis member 14. The housing 36 comprises a channel bight portion 40 and legs 42, whose outstanding forward flanges 44 are welded to the portion 28. Journalled through the legs 42, below the bight portion 40 is a horizontal transverse pin 46 which has a fixed head 48 on one end which bears against the outer side of one leg 42, and a nut 50 on its other end which bears against the outer side of the other leg 42, as shown in Figure 6.

A channel hitch tongue 52 comprises a longitudinally elongated substantially horizontal straight main portion 54 having on its rear end and at right angles thereto, a short depending vertical portion 56 which terminates at its lower end in a right-angular downwardly extending short horizontal hitch ball carrying portion 58. The tongue 52 has a web 60 and depending side flanges 62. At a location near the depending portion 56 the side flanges 62 of the main tongue portion 54 are formed with rows of spaced journal holes 64, for selective reception therethrough of the pivot pin 46, for determining the amount of rearward extension, behind the rear chassis cross member 14, of the hitch ball 66 which is mounted on and rises from the tongue portion 58. The main tongue portion 54 extends forwardly through and freely clears an opening 68 which is provided in the web 70 of the central portion 28 of the rear cross member 14.

The main tongue portion 54 extends beneath and rearwardly beyond the added cross member 30, as seen in Figures 2 and 3, and when in a horizontal intermediate position, is spaced between the upper and lower flanges 16 and 18 of the chassis side members 12. A trailer hitch socket 72, on the forward end of a trailer drawbar 74 is shown as being connected on the hitch ball 66.

Mounted on and extending above and below the extra or added cross member 30 at the center thereof, is a combined spring housing and hitch tongue guide, generally designated 76, which comprises an open rectangular frame 78 having channel upper and lower members 80 and 82, respectively, and vertical channel side members 84, with flanges 86 thereof facing inwardly. The frame 78 is composed of separate and substantially similar upper and lower sections 88 and 90, respectively, the lower section 90 being fixed to and extending below the cross member 30 and the upper section 88 being removably mounted on the cross member 30. As shown in Figures 2, 5 and 7, the web 92 of the cross member 30 is provided with C-shaped cut-outs 99 in which the upper ends of the side members of the lower frame section 90 are welded, as indicated at 95. The upper section side members have lateral lugs 96 on their lower ends which are secured upon the web 92, along with such lower ends, by means of bolts 98 extending through the lugs and the web. The web 92 is provided with a circular opening 100 spaced equidistantly between the cut-outs 94 for freely but guidingly passing a vertical helical spring 102, and an upstanding spring guiding collar 104 rises from the web 92 around the opening 100, as seen in Figures 2 and 5.

The spring 102 extends above and below the web 92 of the cross member 30, and bears, at its lower end upon the web 60 of the main tongue portion 54. A vertical spring compression adjusting screw 106 is threaded downwardly through the web 108 of the upper frame member 80 and has a wrench-receiving head 110 on its upper end. Fixed on the lower end of the screw 106 below the upper frame member 80 is an enlarged diameter inverted cup-shaped spring receiver 112, into which the upper end of the spring 102 seats, as shown in Figures 2 and 3, the receiver 112 being axially aligned with the opening 100 and the vertical axis of the spring 102, so as to keep the spring 102 out of contact with the edges of the opening 100. Obviously, downward threading of the screw increases the compression of the spring 102 and thereby increases its cushioning and shock-absorbing resistance to upswinging of the main tongue portion 54, as forward pitch and load is imposed by the trailer drawbar 74 on the hitch ball 66 on the rear part of the tongue 52, and the tongue is elevated from a depressed position, seen in Figure 2, toward an elevated position, against the resistance of the spring 102, as seen in Figure 3.

As shown in Figures 2, 5, and 6, the tilting movements of the tongue 52 are controlled, limited, and guided, and prevented from lateral deviation to either side, by reason of sliding engagements of related sides of the main tongue portion 54 with the lugs 42 of the pivot pin housing 36 and with the edges 114 of the flanges of the side members 84 of the frame 78. Vertical movements of the tongue are limited and stopped by engagements of the upper and lower sides of the main tongue portion 54 with the edges 116 and 118 of the flanges of the cross member 30 and of the lower member 82 of the frame 78, respectively, as is apparent in Figure 5.

While there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a vehicle chassis frame having longitudinally spaced rear and forward cross members, a hitch comprising a pivot pin housing fixed on said rear cross member, a horizontal pivot pin mounted on and extending across said housing, a hitch tongue comprising a main substantially horizontal portion having a rear end and a forward end, said main portion extending through said housing and being pivoted on said pin at a point near said rear end, the forward end of the main portion being disposed beneath said forward cross member, a ball hitch carrying portion fixed on the rear end of the main portion and located behind said housing, and a combined tongue guide and spring mounting secured on said forward cross member through which the rear end of the tongue main portion extends, said combined mounting having a shock absorbing spring biased downwardly upon the main tongue portion, said pivot pin housing having depending legs disposed at opposite sides of and guidingly engaged with the main tongue portion.

2. In combination, a vehicle chassis frame having spaced horizontal side members having rear ends, a rear cross member extending between and fixed to said rear ends, said rear cross member having a central portion, a forward cross member spaced forwardly from said rear cross member and extending between and secured to said side members, a pivot pin housing fixed on said central portion of the rear cross member, a horizontal pivot pin mounted on and extending across said housing, a hitch tongue comprising a main substantially horizontal portion having a rear end and a forward end, said main portion extending through said housing and being pivoted on said pin at a point near said rear end, the forward end of the main portion being disposed beneath said forward cross member, a ball hitch carrying portion fixed on the rear end of the main portion and located behind said housing, and a combined tongue guide and spring mounting secured on said forward cross member through which the rear end of the tongue main portion extends, said combined mounting having a shock absorbing spring biased downwardly upon the main tongue portion, said pivot pin housing having depending legs disposed at opposite sides of and guidingly engaged with the main tongue portion, said combined mounting comprising an open frame, said frame having a lower cross member spaced below said forward cross member and below the main tongue portion for stop engagement by the main tongue portion on downward swinging of said main portion, said forward cross member having portions serving as a stop for said main portion on upward swinging of the main portion.

3. In combination, a vehicle chassis frame having spaced horizontal side members having rear ends, a rear cross member extending between and fixed to said rear ends, said rear cross member having a central portion, a hitch comprising an extra cross member spaced forwardly from said rear cross member and extending between and secured to said side members, a pivot pin housing fixed on said central portion, a horizontal pivot pin mounted on and extending across said housing, a hitch tongue comprising a main substantially horizontal portion having a rear end and a forward end, said main portion extending through said housing and being pivoted on said pin at a point near said rear end, the forward end of the main portion being disposed beneath said extra cross member, a ball hitch carrying portion fixed on the rear end of the main portion and located behind said housing, and a combined tongue guide and spring mounting secured on said extra cross member through which the rear end of the tongue main portion extends, said combined mounting having a shock absorbing spring biased downwardly upon the main tongue portion, said combined mounting having an upper member spaced above the extra cross member, a screw threaded downwardly through said upper member and carrying a spring receiver on its lower end, said spring being a helical spring having an upper end section in said receiver and a lower end bearing upon the main tongue portion.

4. In combination, a vehicle chassis frame having spaced horizontal side members having rear ends, a rear cross member extending between and fixed to said rear ends, said rear cross member having a central portion, a hitch comprising an extra cross member spaced forwardly from said rear cross member and extending between and secured to said side members, a pivot pin housing fixed on said central portion, a horizontal pivot pin mounted on and extending across said housing, a hitch tongue comprising a main substantially horizontal portion having a rear end and a forward end, said main portion extending through said housing and being pivoted on said pin at a point near said rear end, the forward end of the main portion being disposed beneath said extra cross member, a ball hitch carrying portion fixed on the rear end of the main portion and located behind said housing, and a combined tongue guide and spring mounting secured on said extra cross member through which the rear end of the tongue main portion extends, said combined mounting having a shock absorbing spring biased downwardly upon the main tongue portion, said pivot pin housing having legs disposed at opposite sides of and guidingly engaged with the main tongue portion, said combined mounting comprising an open frame having side vertical members with which related sides of the main tongue portion are guidingly engaged, said frame having a lower member spaced below said extra cross member and below the main tongue portion for stop engagement by the main tongue portion on downward swinging of said main portion, said extra cross member serving as a stop for said main portion on upward swinging of the main portion, said frame having an upper member spaced above said extra cross member, a compression adjusting screw threaded downwardly through said upper frame member having a spring receiver on its lower end within the frame, said extra cross member having an opening vertically aligned with said receiver, said spring being a helical spring extending freely through said opening and having upper and lower ends, the upper end of the spring being engaged in said receiver and the lower end of the spring being engaged with the upper side of the main portion of the tongue.

5. In combination, a vehicle chassis frame having spaced horizontal side members having rear ends, a rear cross member extending between and fixed to said rear ends, said rear cross member having a central portion, a hitch comprising an extra cross member spaced forwardly from said rear cross member and extending between and secured to said side members, a pivot pin housing fixed on said central portion, a horizontal pivot pin mounted on and extending across said housing, a hitch tongue comprising a main substantially horizontal portion having a rear end and a forward end, said main portion extending through said housing and being pivoted on said pin at a point near said rear end, the forward end of the main portion being disposed beneath said extra cross member, a ball hitch carrying portion fixed on the rear end of the main portion and located behind said housing, and a combined tongue guide and spring mounting secured on said extra cross member through which the rear end of the tongue main portion extends, said combined mounting having a shock absorbing spring biased downwardly upon the main tongue portion, said pivot pin housing having legs disposed at opposite sides of and guidingly engaged with the main tongue portion, said combined mounting comprising an open frame having side vertically members with which related sides of the main tongue portion are guidingly engaged, said frame having a lower member spaced below said extra cross member and below the main tongue portion for stop engagement by the main tongue portion on downward swinging of said main portion, said extra cross member serving as a stop for said main portion on upward swinging of the main portion, said frame comprising an upper section removably secured to and extending above said extra cross member and a fixed lower section fixed to and extending below said extra cross member, said main tongue portion extending rearwardly through the lower frame section and below said extra cross member.

6. In combination, a vehicle chassis frame having spaced horizontal side members having rear ends, a rear cross member extending between and fixed to said rear ends, said rear cross member having a central portion, a hitch comprising an extra cross member spaced forwardly from said rear cross member and extending between and secured to said side members, a pivot pin housing fixed on said central portion, a horizontal pivot pin mounted on and extending across said housing, a hitch tongue comprising a main substantially horizontal portion having a rear end and a forward end, said main portion extending through said housing and being pivoted on said pin at a point near said rear end, the forward end of the main portion being disposed beneath said extra cross member, a ball hitch carrying portion fixed on the rear end of the main portion and located behind said housing, and a combined tongue guide and spring mounting secured on said extra cross member through which the rear end of the tongue main portion extends, said combined mounting having a shock absorbing spring biased downwardly upon the main tongue portion, said pivot pin housing having legs disposed at opposite sides of and guidingly engaged with the main tongue portion, said combined mounting comprising an open frame having side vertical members with which related sides of the main tongue portion are guidingly engaged, said frame having a lower member spaced below said extra cross member and below the main tongue portion for stop engagement by the main tongue portion on downward swinging of said main portion, said extra cross member serving as a stop for said main portion on upward swinging of the main portion, said frame having an upper member spaced above said extra cross member, a compression adjusting screw threaded downwardly through said upper frame member having a spring receiver on its lower end within the frame, said extra cross member having an opening vertically aligned with said receiver, said spring being a helical spring extending freely through said opening and having upper and lower ends, the upper end of the spring being engaged in said receiver and the lower end of the spring being engaged with the upper side of the main portion of the tongue, and an upstanding spring guiding collar fixed on said extra cross member around said spring and surrounding the spring.

References Cited in the file of this patent

UNITED STATES PATENTS

| | | |
|---|---|---|
| 1,471,548 | Clement | Oct. 23, 1923 |
| 1,908,711 | Kuchar | May 16, 1933 |
| 2,142,749 | Graves | Jan. 3, 1939 |
| 2,327,308 | Johnston | Aug. 17, 1943 |
| 2,452,710 | Allen | Nov. 2, 1948 |
| 2,590,962 | Gurton et al. | Apr. 1, 1952 |